US012247125B2

(12) United States Patent
Horie et al.

(10) Patent No.: US 12,247,125 B2
(45) Date of Patent: Mar. 11, 2025

(54) CURABLE SILICONE COMPOSITION, ENCAPSULANT AND OPTICAL SEMICONDUCTOR DEVICE

(71) Applicants: DuPont Toray Specialty Materials Kabushiki Kaisha, Tokyo (JP); Rohm and Haas Electronic Materials Korea Ltd., Chungcheongnam-do (KR)

(72) Inventors: Sawako Horie, Chiba (JP); Shunya Takeuchi, Chiba (JP); Akihiko Kobayashi, Chiba (JP); Misoon Jung, Gyeonggi-do (KR); Hyunji Kang, Gyeonggi-do (KR)

(73) Assignees: DuPont Toray Specialty Materials Kabushiki Kaisha, Tokyo (JP); DuPont Specialty Materials Korea Ltd., Chungcheongnam-Do (KR)

( * ) Notice: Subject to any disclaimer, the term of this patent is extended or adjusted under 35 U.S.C. 154(b) by 168 days.

(21) Appl. No.: 17/361,788

(22) Filed: Jun. 29, 2021

(65) Prior Publication Data

US 2022/0017746 A1 Jan. 20, 2022

(30) Foreign Application Priority Data

Jul. 20, 2020 (JP) ................................. 2020-123588

(51) Int. Cl.
*C08L 83/04* (2006.01)
(52) U.S. Cl.
CPC ......... *C08L 83/04* (2013.01); *C08L 2205/025* (2013.01); *C08L 2205/035* (2013.01)
(58) Field of Classification Search
CPC ...................................................... C08L 83/04
See application file for complete search history.

(56) References Cited

U.S. PATENT DOCUMENTS

| 4,528,314 | A | * | 7/1985 | Modic ................... C09D 183/04 524/588 |
| 4,707,531 | A | * | 11/1987 | Shirahata ............... C08G 77/06 556/455 |
| 5,164,461 | A | * | 11/1992 | Mitchell ................. C08L 83/00 528/33 |
| 5,530,076 | A | | 6/1996 | Eguchi et al. |
| 8,373,286 | B2 | | 2/2013 | Yoshitake et al. |
| 8,691,910 | B2 | | 4/2014 | Hasegawa et al. |
| 8,846,828 | B2 | | 9/2014 | Sagawa et al. |
| 8,859,693 | B2 | | 10/2014 | Hasegawa et al. |
| 8,946,353 | B2 | | 2/2015 | Yoshitake et al. |
| 9,909,007 | B2 | | 3/2018 | Chon et al. |
| 10,005,906 | B2 | | 6/2018 | Iimura et al. |
| 10,336,913 | B2 | | 7/2019 | Nishijima et al. |
| 10,927,256 | B2 | | 2/2021 | Muramatsu et al. |
| 2007/0106016 | A1 | * | 5/2007 | Zhu ....................... C08F 283/12 524/588 |
| 2011/0281123 | A1 | * | 11/2011 | Yoshida ................ C09D 183/04 524/506 |
| 2019/0315926 | A1 | | 10/2019 | Hayashi et al. |
| 2020/0216671 | A1 | * | 7/2020 | Matsuzaki ............... C08L 83/04 |

FOREIGN PATENT DOCUMENTS

| CN | 104341777 | A | | 2/2015 |
| CN | 106715591 | A | | 5/2017 |
| JP | H07252419 | A | | 10/1995 |
| JP | 2006335857 | A | | 12/2006 |
| JP | 2009052038 | A | | 3/2009 |
| JP | 2010001336 | A | | 1/2010 |
| JP | 2010084118 | A | | 4/2010 |
| JP | 2010174234 | A | | 8/2010 |
| JP | 2012507582 | A | | 3/2012 |
| JP | 2012233572 | A | | 11/2012 |
| JP | 2012234703 | A | | 11/2012 |
| JP | 2013206759 | A | | 10/2013 |
| JP | 2015018776 | A | | 1/2015 |
| JP | 2015078375 | A | | 4/2015 |
| JP | 2016529331 | A | | 9/2016 |
| JP | 2016534162 | A | | 11/2016 |
| JP | 2018048214 | A | | 3/2018 |
| JP | 2018168216 | A | | 11/2018 |
| WO | 2019/059351 | | * | 3/2019 |
| WO | WO-2019099449 | A1 | * | 5/2019 | ............. C08G 77/08 |

OTHER PUBLICATIONS

English language abstract for JP 2010-001336 A extracted from espacenet.com database on Jul. 1, 2021, 2 pages.
English language abstract for JP 2010-084118 A extracted from espacenet.com database on Jul. 1, 2021, 2 pages.
English language abstract for JP 2012-507582 A extracted from espacenet.com database on Jul. 1, 2021, 2 pages.
English language abstract and machine-assisted English translation for JP 2012-234703 A extracted from espacenet.com database on Jul. 1, 2021, 23 pages.
English language abstract and machine-assisted English translation for JP 2012-233572 A extracted from espacenet.com database on Jul. 1, 2021, 14 pages.
English language abstract and machine-assisted English translation for JP 2013-206759 A extracted from espacenet.com database on Jul. 1, 2021, 38 pages.

(Continued)

*Primary Examiner* — Margaret G Moore
(74) *Attorney, Agent, or Firm* — Howard & Howard Attorneys PLLC

(57) ABSTRACT

A curable silicone composition comprises (A) a resinous alkenyl group-containing organopolysiloxane including at least two alkenyl groups per molecule and at least one (SiO4/2) unit, (B) a resinous organohydrogenpolysiloxane including at least two silicon atom-bonded hydrogen atoms per molecule and at least one (SiO4/2) unit, (C) a catalyst for hydrosilylation reaction, and (D) a curing reaction inhibitor. The curable silicone composition exhibits practically effective curability even at low temperatures, has a low shape deformation and shrinkage rate during curing, can be cured in a short period of time, and can form a transparent and high-hardness cured product.

11 Claims, No Drawings

(56) References Cited

OTHER PUBLICATIONS

English language abstract and machine-assisted English translation for JP 2015-018776 A extracted from espacenet.com database on Jul. 1, 2021, 21 pages.
English language abstract and machine-assisted English translation for JP 2015-078375 A extracted from espacenet.com database on Jul. 1, 2021, 15 pages.
English language abstract for JP 2016-529331 A extracted from espacenet.com database on Jul. 1, 2021, 2 pages.
English language abstract for JP 2016-534162 A extracted from espacenet.com database on Jul. 1, 2021, 2 pages.
English language abstract and machine-assisted English translation for CN 104341777 A extracted from espacenet.com database on May 1, 2024, 13 pages.
English language abstract for CN 106715591 A extracted from espacenet.com database on May 1, 2024, 2 pages.
English language abstract for JP 2010-174234 A extracted from espacenet.com database on May 1, 2024, 2 pages.
English language abstract for JPH 07-252419 A extracted from espacenet.com database on Apr. 3, 2024, 1 page.
English language abstract and machine-assisted English translation for JP 2006-335857 A extracted from espacenet.com database on Apr. 3, 2024, 11 pages.
English language abstract for JP 2009-052038 A extracted from espacenet.com database on Apr. 3, 2024, 2 pages.
English language abstract for JP 2018-048214 A extracted from espacenet.com database on Apr. 3, 2024, 2 pages.
English language abstract and machine-assisted English translation for JP 2018-168216 A extracted from espacenet.com database on Apr. 3, 2024, 34 pages.

\* cited by examiner

CURABLE SILICONE COMPOSITION, ENCAPSULANT AND OPTICAL SEMICONDUCTOR DEVICE

CROSS-REFERENCE TO RELATED APPLICATIONS

The present application claims priority to and all the benefits of Japanese Application No. 2020-123588 filed on Jul. 20, 2020, which is hereby expressly incorporated herein by reference in its entirety.

DESCRIPTION

The present disclosure relates to a curable silicone composition, more specifically, it relates to a curable silicone composition which can be preferably used for an encapsulant for optical semiconductors. In addition, the present disclosure also relates to an optical semiconductor device sealed with the encapsulant comprising a cured product of the curable silicone composition.

BACKGROUND ART

When curable silicone compositions are cured, they form cured products having excellent heat resistance, cold resistance, electrical insulation, weather resistance, water repellency, and transparency, and so they are used in a wide range of industrial fields. Specifically, compared to other organic materials, these cured products are less prone to discolouration and their physical properties deteriorate less, and so they are suitable for optical materials.

In recent years, silicone encapsulants used in optical semiconductor devices such as light emitting diodes (LEDs) are required to have high transparency in order to achieve higher light extraction efficiency. In addition, high dimensional stability is also required in order to realize high production efficiency in the mounting process.

For example, patent document 1 describes a hydrosilylation reaction curable organopolysiloxane composition comprising (A) methylphenylalkenylpolysiloxane that has at least two silicon atom-bonded alkenyl groups per molecule, wherein the diphenylsiloxane unit is 5 mol % or less of the total siloxane units and phenyl groups are at least 20 mol % of the total silicon atom-bonded organic groups in the molecule, (B) methylphenylhydrogenpolysiloxane that has at least two silicon atom-bonded hydrogen atoms per molecule, wherein the diphenylsiloxane unit is 5 mol % or less of the total siloxane units and phenyl groups are at least 20 mol % of the total silicon atom-bonded organic groups in the molecule, and (C) a hydrosilylation reaction catalyst, the composition being characterized in that the diphenylsiloxane units are 5 mol % or less of the total siloxane units in this composition.

In addition, patent document 2 describes a curable organopolysiloxane composition at least comprising: (A) organopolysiloxanes comprising a linear organopolysiloxane represented by general formula: $R^1_3SiO(R^1_2SiO)_mSiR^1_3$ (in the formula, $R^1$ are each independently a non-substituted or halogen-substituted monovalent hydrocarbon group, where, in one molecule, at least two $R^1$ are alkenyl groups and at least 30 mol % of the total $R^1$ are aryl groups, and m is an integer of 5-1000), and a branched organopolysiloxane represented by an average unit formula: $(R^1SiO_{3/2})_g(R^1_2SiO_{2/2})_h(R^1_3SiO_{1/2})_i(SiO_{4/2})_j(XO_{1/2})_k$ {in the formula, $R^1$ has the same meaning as above, where, in one molecule, at least two $R^1$ are alkenyl groups and at least 30 mol % of the total $R^1$ are aryl groups, g is a positive number, h is 0 or a positive number, i is 0 or a positive number, j is 0 or a positive number, k is 0 or a positive number, and h/g is a number between 0 and 10, i/g is a number between 0 and 5, j/(g+h+i+j) is a number between 0 and 0.3, k/(g+h+i+j) is a number between 0 and 0.4}; (B) an organopolysiloxane having at least two silicon atom-bonded hydrogen atoms in one molecule, and in which at least 15 mol % of total silicon atom-bonded organic groups is aryl groups; (C) a branched organopolysiloxane represented by an average unit formula: $(R^2SiO_{3/2})_b(R^2_2SiO_{2/2})_c(R^2_3SiO_{1/2})_d(SiO_{4/2})_e(XO_{1/2})_f$ {in the formula, $R^2$ are each independently an alkyl group, an alkenyl group, an aryl group or an epoxy-containing organic group, where, in one molecule, at least 5 mol % of the total $R^2$ are alkenyl groups, at least 15 mol % are aryl groups, and at least 10 mol % are epoxy-containing organic groups, X is a hydrogen atom or an alkyl group, b is a positive number, c is 0 or a positive number, d is 0 or a positive number, e is 0 or a positive number, f is 0 or a positive number, c/b is a number between 0 and 10, d/b is a number between 0 and 5, e/(b+c+d+e) is a number between 0 and 0.3, and f/(b+c+d+e) is a number between 0 and 0.02.}; and (D) a catalyst for hydrosilylation reaction.

In addition, patent document 3 describes a curable organopolysiloxane composition characterized by at least comprising: (A) a diorganopolysiloxane that has at least two alkenyl groups in one molecule wherein 70 mol % or more of the total siloxane units are methylphenylsiloxane units (where the total content of 1,3,5-trimethyl-1,3,5-triphenyl-cyclotrisiloxane and 1,3,5,7-tetramethyl-1,3,5,7-tetraphenylcyclotetrasiloxane is 5 wt % or less); (B) an organopolysiloxane that has at least two silicon atom-bonded hydrogen atoms in one molecule wherein 15 mol % or more of the silicon atom-bonded organic groups are phenyl groups {in a quantity that provides 10 to 500% for the number of moles of silicon atom-bonded hydrogen atoms in component (B) relative to the total number of moles of alkenyl groups in component (A)}; and (C) a catalyst for hydrosilylation reaction (in a quantity sufficient to cure the composition).

Moreover, patent document 4 describes a curable organopolysiloxane composition at least comprising: (A) a branched organopolysiloxane that has at least three alkenyl groups in one molecule wherein at least 30 mol % of all silicon atom-bonded organic groups are aryl groups; (B) a linear organopolysiloxane that has aryl groups and has both molecular terminals capped with diorganohydrogensiloxy groups {in such an amount that the content of silicon atom-bonded hydrogen atoms in component (B) is 0.5 to 2 mol relative to 1 mol of alkenyl groups in component (A)}; (C) a branched organopolysiloxane that has at least three diorganohydrogensiloxy groups in one molecule wherein at least 15 mol % of all silicon atom-bonded organic groups are aryl groups {in such an amount that the content of the diorganohydrogensiloxy groups in component (C) is 1 to 20 mol % relative to the total amount of the diorganohydrogensiloxy groups contained in component (B) and in component (C)}; and (D) a catalyst for hydrosilylation reaction (in an amount that accelerates curing of the present composition).

Further, patent document 5 describes a curable silicone composition comprising: (A) an organopolysiloxane represented by an average unit formula: $(R^1_3SiO_{1/2})_a(R^1_2SiO_{2/2})_b(R^2SiO_{3/2})_c(R^3SiO_{3/2})_d$ (in the formula, $R^1$ may be the same or different and are alkyl groups having 1 to 12 carbons, alkenyl groups having 2 to 12 carbons, aryl groups having 6 to 20 carbons, or aralkyl groups having 7 to 20 carbons, where at least two $R^1$ in one molecule are the alkenyl groups, $R^2$ is an aryl group having 6 to 20 carbons or an aralkyl group having 7 to 20 carbons, $R^3$ is an alkyl group having 1 to 12 carbons, and a, b, c, and d are respectively numbers satisfying: $0.01 \leq a \leq 0.5$, $0 \leq b \leq 0.7$, $0.01 \leq c < 0.7$, $0.1 \leq d < 0.9$, and $a+b+c+d=1$); (B) a linear organopolysiloxane having at least two silicon atom-bonded alkenyl groups and at least one silicon atom-bonded aryl group in one molecule {in an amount of 0.1 to 150 parts by mass relative to 100 parts by mass of component (A)}; (C) an organopolysiloxane having at least two silicon atom-bonded hydrogen atoms in one molecule {in an amount so that the amount of silicon atom-bonded hydrogen atoms in component (C) is from 0.1 to 5 mol relative to 1 mol of total alkenyl groups in components (A) and (B)}; and (D) a catalyst for hydrosilylation reaction (in an amount that accelerates curing of the present composition).

In addition, patent document 6 describes a curable silicone composition at least comprising: (A) a diorganopolysiloxane having at least two alkenyl groups in one molecule and containing siloxane units represented by the formula: $R^1{}_2SiO_{2/2}$ (in the formula, $R^1$ is an aryl group); (B) at least two types of resinous organopolysiloxanes having different mass average molecular weights based on standard polystyrene conversion according to gel permeation chromatography, and which comprise siloxane units represented by the formula: $SiO_{4/2}$, siloxane units represented by the formula: $R^2{}_2R^3SiO_{1/2}$ (in the formula, $R^2$ is a monovalent hydrocarbon group free from aliphatic unsaturated bonds and $R^3$ is an alkenyl group), and siloxane units represented by the formula: $R^2{}_3SiO_{1/2}$ (in the formula, $R^2$ is as defined above) {in an amount of 10 to 100 parts by mass per 100 parts by mass of component (A)}; (C) an organopolysiloxane having at least two silicon atom-bonded hydrogen atoms in one molecule {in an amount so that the content of silicon atom-bonded hydrogen atoms in component (C) is from 0.1 to 10 mol relative to 1 mol of total alkenyl groups in components (A) and (B)}; and (D) a catalyst for a hydrosilylation reaction in a catalytic amount.

However, since encapsulants using a conventional thermosetting silicone composition need to be treated at a high temperature for a long time to be cured, the shape shrinks during curing, and, as a result, the flexible substrate may be warped, the accuracy of patterning may be lowered during the process for mounting semiconductor elements, or mounted electronic elements or the like may be damaged by heat. Furthermore, conventional silicones that can be cured at room temperature or low temperature have the problem in that the cured product formed has low transparency and adhesiveness, and may not be suitable as an encapsulant in terms of long-term reliability such as delamination. Further, when a conventional curable silicone composition that contains an organopolysiloxane having an aryl group in a molecular chain is used as an encapsulant, the organopolysiloxane having an aryl group is readily affected by temperature, and thus there was a problem in that the viscosity decreases significantly at high temperature which results in the shape deforming easily during curing.

PRIOR ART DOCUMENTS

Patent Documents

[Patent Document 1] Japanese Translation of PCT International Application Publication No. 2012-507582
[Patent document 2] Japanese Unexamined Patent Publication No. 2015-78375
[Patent document 3] Japanese Unexamined Patent Publication No. 2010-84118
[Patent document 4] Japanese Unexamined Patent Publication No. 2010-1336
[Patent Document 5] Japanese Translation of PCT International Application Publication No. 2016-534162
[Patent Document 6] Japanese Translation of PCT International Application Publication No. 2016-529331

SUMMARY OF THE INVENTION

Problem to be Solved by the Invention

An objective of the present disclosure is to provide a silicone composition that exhibits practically effective curability even at low temperatures, has a low shape deformation and shrinkage rate during curing, can be cured in a short period of time, and can form a transparent cured product having high hardness.

Another objective of the present disclosure is to provide an encapsulant including the curable silicone composition of the present disclosure. Yet another objective of the present disclosure is to provide an optical semiconductor device that is sealed with the encapsulant of the present disclosure.

Means for Solving the Problems

In order to solve the abovementioned problems, the present inventors carried out extensive studies, and as a result, surprisingly, they have discovered that with a curable silicone composition containing (A) a resinous alkenyl group-containing organopolysiloxane including at least two alkenyl groups per molecule and at least one $(SiO_{4/2})$ unit, (B) a resinous organohydrogenpolysiloxane including at least two silicon atom-bonded hydrogen atoms per molecule and at least one $(SiO_{4/2})$ unit, (C) a catalyst for hydrosilylation reaction, and (D) a curing reaction inhibitor, it is possible to cure efficiently even at low temperatures, a low shrinkage rate can be achieved during curing, it is possible to cure in a short period of time, and also it is possible to form a cured product having excellent transparency and high hardness, and hence they have arrived at the present disclosure.

According to an embodiment of the present disclosure, (C) the catalyst for hydrosilylation reaction is a platinum-based catalyst and is included in an amount such that the content of the platinum atoms is 10 ppm or less with respect to the total mass of the curable silicone composition.

According to an embodiment of the present disclosure, the content of (D) the curing reaction inhibitor is 200 ppm or more with respect to the total mass of the curable silicone composition.

According to an embodiment of the present disclosure, the curable silicone composition may further include a linear alkenyl group-containing organopolysiloxane and/or a resinous alkenyl group-containing organopolysiloxane free from siloxane units represented by $RSiO_{4/2}$.

According to an embodiment of the present disclosure, the curable silicone composition may further include a linear organohydrogenpolysiloxane.

The present disclosure also relates to an encapsulant comprising the curable silicone composition according to the present disclosure.

The present disclosure also relates to an optical semiconductor device that is equipped with the encapsulant according to the present disclosure.

Effects of the Invention

With the curable silicone composition according to the present disclosure, practically effective curability is exhibited even at low temperatures, low shape deformation or shrinkage rate during curing is obtained, and it is possible to cure in a short period of time, and also, a transparent cured product having high hardness can be provided.

In addition, with the encapsulant of the present disclosure, since it is formed from the curable silicone composition of the present disclosure, semiconductor elements can be sealed at a low temperature and in a short period of time. Therefore, it is possible to prevent the sealing shape from being deformed due to a decrease in viscosity during curing caused by heating at high temperature for a long period of time, and to prevent semiconductor elements from being damaged by heat. Furthermore, with the encapsulant of the present disclosure, semiconductor elements can be sealed with a transparent cured product having high hardness. Therefore, a semiconductor package with excellent reliability and transparency can be manufactured.

MODE FOR CARRYING OUT THE INVENTION

Hereinafter, the present disclosure will be described in more detail.

Curable Silicone Composition

The present disclosure relates to a curable silicone composition which can be practically cured at low temperatures, and comprises:
(A) a resinous alkenyl group-containing organopolysiloxane including at least two alkenyl groups per molecule and at least one ($SiO_{4/2}$) unit;
(B) a resinous organohydrogenpolysiloxane including at least two silicon atom-bonded hydrogen atoms per molecule and at least one ($SiO_{4/2}$) unit;
(C) a catalyst for hydrosilylation reaction; and
(D) a curing reaction inhibitor.

The curable silicone composition of the present disclosure can be effectively cured in practice even at a low temperature. The curing temperature is not particularly limited, and, for example, is 120° C. or lower, preferably 100° C. or lower. Further, the curing temperature can usually be higher than normal temperature. The curing time is not particularly limited, but is a time that does not cause any problems in practical use, for example, in the case of curing at 60° C., it is within 60 minutes, preferably within 50 minutes, and, for example, in the case of curing at 100° C., it is preferably within 45 minutes, and more preferably within 30 minutes.

The viscosity of the curable silicone composition according to the present disclosure is not particularly limited, but is, for example, at a temperature of 25° C., 1000 mPa·s or more, more preferably 2000 mPa·s or more, even more preferably 3000 mPa·s or more, and preferentially 3500 mPa·s or more, and particularly preferably 4000 mPa·s or more. In addition, the viscosity of the curable silicone composition according to the present disclosure is, for example, at a temperature of 25° C., 20,000 mPa·s or less, preferably 18,000 mPa·s or less, and more preferably 15,000 mPa·s or less, even more preferably 12,000 mPa·s or less. In the present specification, the viscosity can be measured by using a rotary viscometer conforming to JIS K7117-1 at 25° C.

The curable silicone composition according to the present disclosure can be cured to form a cured product having high hardness. With regard to the cured product obtained by curing the curable silicone composition of the present disclosure, preferably, a type D durometer hardness of 20 or more, or 30 or more, at 25° C., is preferred. The type D durometer hardness is determined by means of a type D durometer according to JIS K 6253-1997 "Hardness test method for vulcanized rubber and thermoplastic rubber".

The curable silicone composition according to the present disclosure can be cured to form a cured product having excellent transparency. Specifically, the cured product of the curable silicone composition of the present disclosure has a light transmittance of preferably 80% or more, more preferably 90% or more, and particularly preferably 95% or more at a wavelength of 400 nm to 700 nm. The light transmittance of the cured product of the curable silicone composition can be determined, for example, by measuring the cured product having an optical path length of 1 mm with a spectrophotometer.

The various components are described in detail below.
(A) Resinous Alkenyl Group-Containing Organopolysiloxane Component (A) is a resinous alkenyl group-containing organopolysiloxane including at least two alkenyl groups in one molecule and at least one ($SiO_{4/2}$) unit. The curable silicone composition according to the present disclosure may contain one kind of component (A), or two or more kinds of component (A) may be used in combination.

In the present specification, the term "resinous" means that there is a branched structure or a 3D network structure in the molecular structure. The resinous alkenyl group-containing organopolysiloxane of component (A) contains at least one siloxane unit (unit Q) represented by $RSiO_{4/2}$ and may optionally contain a siloxane unit (unit T) represented by $SiO_{3/2}$ in the molecular structure thereof, but it is preferably free from unit T.

Examples of the alkenyl group in component (A) include C2-12 alkenyl groups such as a vinyl group, an allyl group, a butenyl group, a pentenyl group, a hexenyl group, a heptenyl group, an octenyl group, a nonenyl group, a decenyl group, an undecenyl group, and a dodecenyl group, and a vinyl group is preferred.

Examples of a group that bonds to a silicon atom other than the alkenyl group in component (A) include optionally halogen-substituted monovalent hydrocarbon groups other than alkenyl groups, and specific examples include, for example: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (A) may have a small quantity of hydroxyl groups or an alkoxy group such as a methoxy group or ethoxy group within the scope of not adversely affecting the objectives of the present disclosure. A group that bonds to the silicon atom other than the alkenyl groups in component (A) is preferably selected from among C1-6 alkyl groups, particularly methyl groups.

In one embodiment of the present disclosure, component (A) is represented by $(R^1{}_3SiO_{1/2})_a(R^1{}_2SiO_{2/2})_b$
$(R^1SiO_{3/2})_c(SiO_{4/2})_d(XO_{1/2})_e$ (A-1) average unit formula (I):

(in formula (I), $R^1$ are the same or different optionally halogen-substituted monovalent hydrocarbons, where at least two $R^1$ in one molecule are alkenyl groups, and $0 \leq a < 1$, $0 \leq b < 1$, $0 \leq c < 0.9$, $0 < d < 0.8$, $0 \leq e < 0.4$, and $a+b+c+d=1.0$ are satisfied).

Examples of the optionally halogen-substituted monovalent hydrocarbon groups of $R^1$ in the above formula (I) include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^1$ may also be a hydroxyl group or an alkoxy group such as methoxy or ethoxy groups, in small quantities, within the scope of not adversely affecting the objectives of the present disclosure. $R^1$ is selected from among preferably C1-6 alkyl groups, particularly a methyl group, or C2-6 alkenyl groups, particularly a vinyl group.

In formula (I), a is preferably in the range of $\leq 0.1 \leq a \leq 0.9$, more preferably in the range of $0.3 \leq a \leq 0.6$, even more preferably in the range of $0.5 \leq a \leq 0.7$. In formula (I), b is preferably in the range of $0 \leq b \leq 0.5$, more preferably in the range of $0 \leq b \leq 0.3$, and particularly in the range of $0 \leq b \leq 0.1$. In formula (I), c is preferably in the range of $0 \leq c \leq 0.5$, more preferably in the range of $0 \leq c \leq 0.3$, and particularly in the range of $0 \leq c \leq 0.1$. In formula (I), d is preferably in the range of $0.1 \leq d \leq 0.7$, more preferably in the range of $0.2 \leq d \leq 0.6$, and particularly in the range of $0.3 \leq d \leq 0.5$. In formula (I), e is preferably in the range of $0 \leq e \leq 0.15$, more preferably in the range of $0 \leq e \leq 0.1$, and particularly in the range of $0 \leq e \leq 0.05$.

According to a preferred embodiment of the present disclosure, the resinous alkenyl group-containing organopolysiloxane of component (A) includes an alkenyl group in molecular terminals. The resinous organopolysiloxane of component (A) preferably has an alkenyl group in the siloxane unit (unit M) represented by $SiO_{1/2}$ and optionally has an alkenyl group in the molecular side chains (i.e., the siloxane unit (unit D) represented by $SiO_{2/2}$ and the siloxane unit (unit T) represented by $SiO_{3/2}$), but it is preferably free from the alkenyl group.

According to a preferred embodiment of the present disclosure, the resinous alkenyl group-containing organopolysiloxane of component (A) preferably comprises unit M and a siloxane unit (unit Q) represented by $SiO_{4/2}$, and is free from unit D and unit T. Hence, according to a preferred embodiment of the present disclosure, component (A) can be represented by $(R^1{}_3SiO_{1/2})_a(SiO_{4/2})_d(XO_{1/2})_e$  (A-2) average unit formula (II):

(in the formula, $R^1$ are the same or different optionally halogen-substituted monovalent hydrocarbons, where at least two $R^1$ in one molecule are alkenyl groups, and $0 \leq a < 1$, $0 < d < 0.8$, $0 \leq e < 0.4$, and $a+d=1.0$ are satisfied).

The optionally halogen-substituted monovalent hydrocarbon groups, a, d and e in the formula (II) have the same meanings as those described for formula (I) and the same description applies.

The content of the alkenyl group in the entire silicon atom-bonded organic group of component (A) is not particularly limited, and for example, this may be 1 mol % or more, preferably 2 mol % or more, more preferably 5 mol % or more of the total of the silicon atom-bonded organic groups, and 30 mol % or less, preferably 20 mol % or less and more preferably 15 mol % or less of the total of the silicon atom-bonded organic groups. The alkenyl group content can be determined, for example, by means of analysis techniques such as Fourier transform infrared spectrophotometry (FT-IR) or nuclear magnetic resonance (NMR), or by means of a titration method described below.

A method for determining the alkenyl group amount in the components by means of titration technique will be described. The alkenyl group content in the organopolysiloxane components can be accurately quantified by means of a titration method generally known as a Wijs method. The principle will be described below. Firstly, an alkenyl group in the organopolysiloxane starting material and iodine monochloride are subjected to an addition reaction as shown in formula (1). Next, according to the reaction shown in formula (2), an excess amount of iodine monochloride is reacted with potassium iodide, thereby freeing iodine. The freed iodine is subjected to titration with a sodium thiosulfate solution.

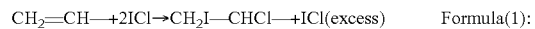
$CH_2=CH-+2ICl \rightarrow CH_2I-CHCl-+ICl(excess)$　　Formula(1):

$ICl+KI \rightarrow I_2+KCl$　　Formula (2):

The alkenyl group amount in the component can be quantified from the difference between the amount of sodium thiosulfate required for titration and the titration amount of the blank solution prepared separately.

The viscosity of the organopolysiloxane of component (A) is not particularly limited, and for example, is within the range of from 50 mPa to 1000 mPa at 25° C. In the present specification, the viscosity of the organopolysiloxane component can be measured at 25° C. using a rotary viscometer conforming to JIS K7117-1.

The content of component (A) is not particularly limited, but is preferably 1 mass % or more, more preferably 2 mass % or more, even more preferably 3 mass % or more, particularly preferably 4 mass % or more, based on the total mass of the whole organopolysiloxane components included in the curable silicone composition of the present disclosure. In addition, preferably, the content of component (A) is 40 mass % or less, more preferably 35 mass % or less, even more preferably 30 mass % or less, particularly preferably 25 mass % or less, based on the total mass of the whole organopolysiloxane components.

(B) Resinous Organohydrogenpolysiloxane

Component (B) is a resinous organohydrogenpolysiloxane which acts as a cross-linking agent for a curable silicone composition by a hydrosilylation curing reaction, has at least two silicon atom-bonded hydrogen atoms per molecule, and has a resinous structure. The curable silicone composition according to the present disclosure may contain one type of component (B), or two or more types of component (B) may be used in combination.

The resinous organohydrogenpolysiloxane of component B includes at least one unit Q in the molecular structure thereof and optionally includes unit T, but it is preferably free from unit T.

Examples of silicon atom-bonded groups other than hydrogen atoms in component (B) include optionally halogen-substituted monovalent hydrocarbon groups other than alkenyl groups, for example, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (B) may also have a small amount of hydroxyl groups or alkoxy groups such as methoxy or ethoxy groups, within the scope of not adversely affecting the objectives of the present disclosure. The silicon atom-bonded groups other than hydrogen atoms in component (B) can be selected from C1-6 alkyl groups, in particular, a methyl group.

According to an embodiment of the present disclosure, component (B) can be a resinous organohydrogenpolysiloxane represented by:

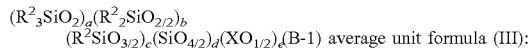  (B-1) average unit formula (III):

(in the formula, $R^2$ are the same or different optionally halogen-substituted monovalent hydrocarbon groups other than alkenyl groups, where at least two $R^2$ are hydrogen atoms, X is a hydrogen atom or an alkyl group, a, b, c, d, and e satisfy $0 \leq a \leq 1.0$, $0 \leq b \leq 1.0$, $0 \leq c \leq 0.9$, $0 \leq d \leq 0.8$, and $0 \leq e \leq 0.4$, and a+b+c+d=1.0).

Examples of optionally halogen-substituted monovalent hydrocarbon groups other than alkenyl groups represented by $R^2$ in formula (III) include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. $R^2$ may also be a hydroxyl group or an alkoxy group such as methoxy or ethoxy, in small amounts, within the scope of not adversely affecting the objectives of the present disclosure. $R^2$ is preferably selected from among a hydrogen atom, C1-6 alkyl groups, particularly a methyl group.

X in formula (III) of component (B) is a hydrogen atom or an alkyl group. The alkyl group of X is preferably a C1-3 alkyl group, and specific examples include methyl, ethyl, and propyl groups.

In formula (III), a is preferably in the range of $0.2 \leq a \leq 0.8$, more preferably in the range of $0.3 \leq a \leq 0.7$, even more preferably in the range of $0.4 \leq a \leq 0.6$. In formula (III), b is preferably in the range of $0 \leq b \leq 0.5$, more preferably in the range of $0 \leq b \leq 0.3$, and particularly in the range of $0 \leq b \leq 0.1$. In formula (III), c is preferably in the range of $0 \leq c \leq 0.5$, more preferably in the range of $0 \leq c \leq 0.3$, and particularly in the range of $0 \leq c \leq 0.1$. In formula (III), d is preferably in the range of $0.2 \leq d \leq 0.8$, more preferably in the range of $0.3 \leq d \leq 0.7$, and particularly in the range of $0.4 \leq d \leq 0.6$. In formula (III), e is preferably in the range of $0 \leq e \leq 0.3$, more preferably in the range of $0 \leq e \leq 0.2$, and particularly in the range of $0 \leq e \leq 0.1$.

Component (B) preferably includes a silicon atom-bonded hydrogen atom in the molecular terminals, and also the molecular side chain may optionally have a silicon atom-bonded hydrogen atom, but preferably the molecular side chain is free from silicon atom-bonded hydrogen atoms. Preferably, component (B) has a silicon atom-bonded hydrogen atom only in the molecular terminals. That is, according to an embodiment of the present disclosure, component (B) has a silicon atom-bonded hydrogen atom in unit M, and preferably has a silicon atom-bonded hydrogen atom only in unit M. In addition, according to another embodiment, component (B) optionally has unit T and unit D, but is preferably free from these units.

According to a preferred embodiment of the present disclosure, component (B) includes (B-2) a resinous organo- hydrogenpolysiloxane consisting of only unit M and unit Q, and this resinous organohydrogenpolysiloxane (B-2) can be represented by the following average unit formula (IV):

  Average unit formula (IV):

In the formula, $R^2$, X, a, d, and e have the same meanings as those described for formula (III).

The viscosity of the organopolysiloxane of component (B) is not particularly limited, and for example, is within the range of from 1 mPa to 500 mPa at 25° C.

The content of component (B) is not particularly limited, but is preferably 0.5 mass % or more, more preferably 1 mass % or more, even more preferably 1.5 mass % or more, particularly preferably 2 mass % or more, based on the total mass of the whole organopolysiloxane components included in the curable silicone composition of the present disclosure. In addition, the content of component (B) is preferably 30 mass % or less, more preferably 20 mass % or less, even more preferably 15 mass % or less, based on the total mass of the whole organopolysiloxane components.

<Other Organopolysiloxane Components>

The curable silicone composition according to the present disclosure may also include other organopolysiloxane components as below, in addition to the abovementioned components (A) and (B).

(Linear Alkenyl Group-Containing Organopolysiloxane)

The curable silicone composition according to the present disclosure may include a linear alkenyl group-containing organopolysiloxane, in addition to the abovementioned components (A) and (B). The curable silicone composition according to the present disclosure may comprise one type of a linear alkenyl group-containing organopolysiloxane, or may comprise two or more types of linear alkenyl group-containing organopolysiloxane in combination.

Examples of the alkenyl groups in the linear alkenyl group-containing organopolysiloxane include C2-12 alkenyl groups such as vinyl, allyl, butenyl, pentenyl, hexenyl, heptenyl, octenyl, nonenyl, decenyl, undecenyl, or dodecenyl groups, and a vinyl group is preferable.

According to a preferred embodiment of the present disclosure, the linear alkenyl group-containing organopolysiloxane has at least one aryl group. The aryl group may be optionally substituted and is preferably a C6-20 aryl group, and examples include a phenyl group, a tolyl group, a xylyl group, a naphthyl group, an anthracenyl group, a phenanthryl group, a pyrenyl group, and any of these aryl groups in which the hydrogen atom is substituted with an alkyl group such as a methyl group or ethyl group, an alkoxy group such as a methoxy group or ethoxy group, or a halogen atom such as a chlorine atom or bromine atom. The aryl group is particularly preferably an optionally substituted phenyl group, and more preferably an unsubstituted phenyl group.

Examples of silicon atom-bonded groups other than alkenyl and aryl groups in the linear alkenyl group-containing organopolysiloxane include optionally halogen-substituted monovalent hydrocarbon groups other than alkenyl and aryl groups, for example, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C7-20 aralkyl groups such as benzyl, phenethyl and phenylpropyl groups; and any of these groups in which some or all of the hydrogen atoms are substituted with halogen atoms such as fluorine, chlorine, and bromine atoms.

This linear alkenyl group-containing organopolysiloxane can be represented by the following average structural formula (V): average structural formula (V): $R^3_3SiO(R^3_2SiO)_mSiR^3_3$, (in formula (V), $R^3$ are the same or different optionally halogen-substituted monovalent hydrocarbon groups, where at least two $R^3$ are alkenyl groups in one molecule, and m is an integer of from 4 to 1000).

Examples of the optionally halogen-substituted monovalent hydrocarbon groups represented by $R^3$ include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms.

m in formula (V) is preferably 10 or more, more preferably 40 or more, particularly preferably 70 or more, and preferably 500 or less, more preferably 300 or less, even more preferably 200 or less, particularly preferably 120 or less.

According to a preferred embodiment of the present disclosure, the additional linear alkenyl group-containing organopolysiloxane may be a linear organopolysiloxane that has alkenyl groups in both molecular terminals in which the both molecular terminals are capped with alkenyl groups. The additional linear organopolysiloxane optionally has an alkenyl group in the molecular side chains (i.e., the siloxane unit (unit D) represented by $SiO_{2/2}$), but it is preferably free from alkenyl groups.

According to a preferred embodiment of the present disclosure, the additional linear alkenyl group-containing organopolysiloxane has a silicon atom-bonded aryl group in the molecular side chain. The additional linear organopolysiloxane optionally has an aryl group in the molecular terminals (i.e., the siloxane unit (unit M) represented by $SiO_{1/2}$), but it is preferably free from aryl groups.

The content of the alkenyl group in the whole silicon atom-bonded organic groups of the linear alkenyl group-containing organopolysiloxane is not particularly limited, and, for example, it is 0.01 mol % or more, preferably 0.1 mol % or more, more preferably 0.2 mol % or more of the total of the silicon atom-bonded organic groups, and 30 mol % or less, preferably 20 mol %, more preferably 10 mol % or less of the total of the silicon atom-bonded organic groups. The alkenyl group content can be determined, for example, by means of an analysis technique such as Fourier transform infrared spectrophotometry (FT-IR) or nuclear magnetic resonance (NMR), or by means of the aforementioned titration method.

The content of the aryl group in the whole silicon atom-bonded organic groups of the linear alkenyl group-containing organopolysiloxane is not particularly limited, and for example, it is 10 mol % or more, preferably 20 mol % or more, more preferably 30 mol % or more of the total of the silicon atom-bonded organic groups, and 70 mol % or less, preferably 60 mol % or less, more preferably 50 mol % or less of the total of the silicon atom-bonded organic groups. The aryl group content can be determined, for example, by analysis such as Fourier transform infrared spectrophotometry (FT-IR) or nuclear magnetic resonance (NMR).

The content of the linear alkenyl group-containing organopolysiloxane is not particularly limited, but is preferably 1 mass % or more, more preferably 2 mass % or more, even more preferably 3 mass % or more, particularly preferably 4 mass % or more, based on the total mass of the whole organopolysiloxane components included in the curable silicone composition of the present disclosure. In addition, the content of the linear alkenyl group-containing organopolysiloxane is preferably 30 mass % or less, more preferably 20 mass % or less, even more preferably 10 mass % or less, based on the total mass of the whole organopolysiloxane components.

(Resinous Alkenyl Group-Containing Organopolysiloxane Free from Unit Q)

The curable silicone composition according to the present disclosure may include a resinous alkenyl group-containing organopolysiloxane free from unit Q, in addition to the abovementioned components (A) and (B). The curable silicone composition according to the present disclosure may comprise one type of resinous alkenyl group-containing organopolysiloxane free from unit Q, or may comprise two or more types of resinous alkenyl group-containing organopolysiloxane free from unit Q in combination.

The resinous alkenyl group-containing organopolysiloxane free from unit Q may be a resinous alkenyl group-containing organopolysiloxane that has at least two alkenyl groups in one molecule. In addition, the resinous alkenyl group-containing organopolysiloxane free from unit Q may optionally have at least one aryl group in one molecule. According to a preferred embodiment, the resinous alkenyl group-containing organopolysiloxane that may be included in the present disclosure includes at least two alkenyl groups and at least one aryl group in one molecule.

The resinous alkenyl group-containing organopolysiloxane free from unit Q includes at least one unit T in the molecular structure thereof.

As the alkenyl group in the resinous alkenyl group-containing organopolysiloxane free from unit Q, the same alkenyl groups mentioned above as the alkenyl group in the linear alkenyl group-containing organopolysiloxane may be used as examples.

The resinous alkenyl group-containing organopolysiloxane can be represented by the following average unit formula (VI):

Average unit formula (VI):

(in formula (VI), $R^4$ are the same or different optionally halogen-substituted monovalent hydrocarbon groups, where at least two $R^4$ are alkenyl groups in one molecule, X is a hydrogen atom or an alkyl group, and $0 \leq a<1$, $0 \leq b<1$, $0<c<0.9$, $0 \leq e<0.4$, and $a+b+c=1.0$ are satisfied).

Examples of the optionally halogen-substituted monovalent hydrocarbon groups of $R^4$ in formula (VI) include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^4$ may also be a hydroxyl group or an alkoxy group such as methoxy or ethoxy groups, in small amounts, within the scope of not adversely affecting the objectives of the present disclosure. $R^4$ is selected from among preferably C6-20 allyl groups, particularly a phenyl group, C1-6 alkyl groups, particularly a methyl group, or C2-6 alkenyl groups, particularly a vinyl group.

X in formula (VI) is a hydrogen atom or an alkyl group. The alkyl group of X is preferably a C1-3 alkyl group, and specific examples include methyl, ethyl, and propyl groups.

In formula (VI), a is preferably in the range of $0.1 \leq a \leq 0.8$, more preferably in the range of $0.15 \leq a \leq 0.6$, even more preferably in the range of $0.2 \leq a \leq 0.5$. In formula (VI), b is preferably in the range of $0 \leq b \leq 0.5$, more preferably in the range of $0 \leq b \leq 0.3$, and particularly in the range of $0 \leq b \leq 0.1$. In formula (VI), c is preferably in the range of $0.3 \leq c \leq 0.9$, more preferably in the range of $0.45 \leq c \leq 0.85$, and particularly in the range of $0.6 \leq c \leq 0.8$. In formula (VI), e is preferably in the range of $0 \leq e \leq 0.15$, more preferably in the range of $0 \leq e \leq 0.1$, and particularly in the range of $0 \leq e \leq 0.05$.

The alkenyl group-containing resinous organopolysiloxane free from unit Q preferably includes alkenyl groups in the molecular terminals. Preferably, the alkenyl group-containing resinous organopolysiloxane free from unit Q has an alkenyl group in unit M and optionally has an alkenyl group in unit D and/or unit T, but it is preferably free from alkenyl groups. In addition, the alkenyl group-containing resinous organopolysiloxane free from unit Q optionally contains unit D, but preferably is free from unit D.

The content of the alkenyl group in the whole silicon atom-bonded organic groups in the resinous alkenyl group-containing organopolysiloxane free from unit Q is not particularly limited, and, for example, it is 1 mol % or more, preferably 2 mol % or more, more preferably 3 mol % or more of the total of the silicon atom-bonded organic groups, and 50 mol % or less, preferably 40 mol % or less, more preferably 35 mol % or less of the total of the silicon atom-bonded organic groups. The alkenyl group content can be determined, for example, by means of an analysis technique such as Fourier transform infrared spectrophotometry (FT-IR) or nuclear magnetic resonance (NMR), or by means of the aforementioned titration method.

According to an embodiment of the present disclosure, when the resinous alkenyl group-containing organopolysiloxane free from unit Q includes an aryl group, the content of the aryl group in the whole silicon atom-bonded organic groups is not particularly limited, and, for example, it is 3 mol % or more, preferably 7 mol % or more, more preferably 10 mol % or more of the total of the silicon atom-bonded organic groups, and 60 mol % or less, preferably 50 mol % or less, more preferably 40 mol % or less of the total of the silicon atom-bonded organic groups. The aryl group content can be determined, for example, by analysis such as Fourier transform infrared spectrophotometry (FT-IR) or nuclear magnetic resonance (NMR).

The content of the resinous alkenyl group-containing organopolysiloxane free from unit Q is not particularly limited, but it is included in an amount of preferably 10 mass % or more, more preferably 20 mass % or more, even more preferably 30 mass % or more based on the total mass of the whole organopolysiloxane components of the curable silicone composition of the present disclosure, and also, it is included in an amount of 80 mass % or less, preferably 70 mass % or less, more preferably 60 mass % or less based on the total mass of the whole organopolysiloxane components, for example.

(Linear Organohydrogenpolysiloxane)

The curable silicone composition according to the present disclosure may include a linear organohydrogenpolysiloxane, in addition to the abovementioned components (A) and (B). The curable silicone composition according to the present disclosure may comprise one type of a linear organohydrogenpolysiloxane, or may comprise two or more types of linear organohydrogenpolysiloxane in combination.

The linear organohydrogenpolysiloxane has at least two silicon atom-bonded hydrogen atoms in one molecule. In addition, preferably, the additional linear organohydrogenpolysiloxane has at least one aryl group in one molecule.

The aryl group that may be included in the linear organohydrogenpolysiloxane may be optionally substituted and is preferably a C6-20 aryl group, and examples include a phenyl group, a tolyl group, a xylyl group, a naphthyl group, an anthracenyl group, a phenanthryl group, a pyrenyl group, and any of these aryl groups in which the hydrogen atom is substituted with an alkyl group such as a methyl group or ethyl group, an alkoxy group such as a methoxy group or ethoxy group, or a halogen atom such as a chlorine atom or bromine atom. The aryl groups are particularly preferably optionally substituted phenyl groups, and more preferably unsubstituted phenyl groups.

Examples of other silicon atom-bonded organic groups in the linear organohydrogenpolysiloxane include optionally halogen-substituted monovalent hydrocarbon groups other than alkenyl groups, for example, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C7-20 aralkyl groups such as benzyl, phenethyl and phenylpropyl groups; and any of these groups in which some or all of the hydrogen atoms are substituted with halogen atoms such as fluorine, chlorine, and bromine atoms. A small quantity of hydroxyl groups or alkoxy groups such as methoxy or ethoxy groups may be included within the scope of adversely affecting the objectives of the present disclosure. The organic group that bonds to the silicon atom in the linear organohydrogenpolysiloxane is preferably selected from among C6-20 aryl groups, particularly phenyl groups, and C1-6 alkyl groups, particularly methyl groups.

According to an embodiment of the present disclosure, when the curable silicone composition includes a linear organohydrogenpolysiloxane, the linear organohydrogenpolysiloxane can be represented by the following average structural formula (VII):

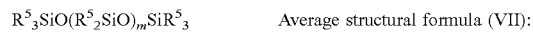 Average structural formula (VII):

$$R^5{}_3SiO(R^5{}_2SiO)_m SiR^5{}_3$$

In the formula, $R^5$ are hydrogen atoms or the same or different optionally halogen-substituted monovalent hydrocarbon groups other than alkenyl groups, where at least two $R^5$ in one molecule are hydrogen atoms and m is an integer of from 1 to 100.

Examples of the optionally halogen-substituted monovalent hydrocarbon groups other than alkenyl groups of $R^5$ in formula (VII) include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. $R^5$ may also be a hydroxyl group or an alkoxy group such as methoxy or ethoxy, in small amounts, within the scope of not adversely affecting the objectives of the present disclosure. $R^5$ is preferably selected from among a hydrogen atom, C6-20 aryl groups, particularly a phenyl group, and C1-6 alkyl groups, particularly a methyl group.

m in formula (VII) is preferably 50 or less, more preferably 20 or less, even more preferably 10 or less, particularly preferably 5 or less.

According to a preferred embodiment of the present disclosure, the linear organohydrogenpolysiloxane has a silicon atom-bonded hydrogen atom in both molecular terminals. The linear organohydrogenpolysiloxane has a silicon atom-bonded hydrogen atom in unit M and optionally has a silicon atom-bonded hydrogen atom in unit D, but is preferably free from silicon atom-bonded hydrogen atoms.

The additional linear organohydrogenpolysiloxane preferably has a silicon atom-bonded aryl group in the molecular side chain. The linear organopolysiloxane optionally has an aryl group in the molecular terminals but preferably is free from aryl groups.

According to an embodiment of the present disclosure, when the linear organohydrogenpolysiloxane includes an aryl group, the content of the aryl group in the whole silicon atom-bonded organic groups is not particularly limited, and, for example, it is 10 mol % or more, preferably 15 mol % or more, more preferably 20 mol % or more of the total of the silicon atom-bonded organic groups, and 50 mol % or less, preferably 40 mol % or less, more preferably 30 mol % or less of the total of the silicon atom-bonded organic groups. The aryl group content can be determined, for example, by analysis such as Fourier transform infrared spectrophotometry (FT-IR) or nuclear magnetic resonance (NMR).

The content of the linear organohydrogenpolysiloxane is not particularly limited, but it can be included in an amount of preferably 3 mass % or more, more preferably 5 mass % or more, even more preferably 10 mass % or more based on the total mass of the whole organopolysiloxane components of the curable silicone composition of the present disclosure, and also, it can be included in an amount of 30 mass % or less, preferably 25 mass % or less, more preferably 20 mass % or less based on the total mass of the whole organopolysiloxane components.

(Epoxy Group-Containing Resinous Organopolysiloxane)

According to yet another embodiment, the curable silicone composition of the present disclosure may include an epoxy group-containing resinous organopolysiloxane, and this epoxy group-containing resinous organopolysiloxane can be represented by average unit formula (VIII): $(R^6_3SiO_{1/2})_a(R^6_2SiO_{2/2})_b(R^6SiO_{3/2})_c(SiO_{4/2})_d(XO_{1/2})_e$ (in the formula, $R^6$ is the same or different optionally halogen-substituted monovalent hydrocarbon group or epoxy group-containing organic group, where at least one $R^6$ is an epoxy group-containing organic group, X is a hydrogen atom or an alkyl group and $0 \leq a < 1$, $0 \leq b < 1$, $0 \leq c < 0.9$, $0 \leq d < 0.5$, $0 \leq e < 0.4$, $a+b+c+d+1.0$, and $c+d > 0$ are satisfied).

In formula (VIII), $R^6$ is preferably selected from among C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms; and epoxy group-containing organic groups. Examples of the epoxy group-containing groups include, for example: glycidoxyalkyl groups such as a 2-glycidoxyethyl group, a 3-glycidoxypropyl group and a 4-glycidoxybutyl group; epoxycycloalkyl alkyl groups such as a 2-(3,4-epoxycylohexyl)-ethyl group and a 3-(3,4-epoxycylohexyl)-propyl group; and epoxyalkyl groups such as a 3,4-epoxybutyl group and a 7,8-epoxyoctyl group, and a glycidoxyalkyl group is preferable and a 3-glycidoxypropyl group is particularly preferable.

In formula (VIII), a is preferably in the range of $0 \leq a \leq 0.8$, more preferably in the range of $0.05 \leq a \leq 0.6$, particularly in the range of $0.1 \leq a \leq 0.4$. In formula (VIII), b is preferably in the range of $0 \leq b \leq 0.9$, more preferably in the range of $0.1 \leq b \leq 0.8$, and particularly in the range of $0.2 \leq b \leq 0.7$. In formula (VIII), c is preferably in the range of $0 \leq c \leq 0.9$, more preferably in the range of $0.1 \leq c \leq 0.85$, and particularly in the range of $0.2 \leq c \leq 0.8$. In formula (VIII), d is preferably in the range of $0 \leq d \leq 0.7$, more preferably in the range of $0 \leq d \leq 0.5$, even more preferably in the range of $0 \leq d \leq 0.2$. In formula (VIII), e is preferably in the range of $0 \leq e \leq 0.3$, more preferably in the range of $0 \leq e \leq 0.2$, and particularly in the range of $0 \leq e \leq 0.1$.

According to a preferred embodiment, the epoxy group-containing resinous organopolysiloxane includes an alkenyl group for $R^6$. The amount of alkenyl groups in the whole silicon atom-bonded organic groups in the epoxy group-containing resinous organopolysiloxane is not particularly limited, and is preferably 1 mol % or more, more preferably 2 mol % or more, even more preferably 3 mol % or more, and, for example, is 30 mol % or less, preferably 25 mol % or less, more preferably 20 mol % or less.

According to a preferred embodiment, the amount of the epoxy group-containing organic groups in the whole silicon atom-bonded organic groups in the epoxy group-containing resinous organopolysiloxane is not particularly limited, and is preferably 1 mol % or more, more preferably 5 mol % or more, even more preferably 10 mol % or more, and, for example, is 50 mol % or less, preferably 40 mol % or less, more preferably 30 mol % or less. The amount of the epoxy group-containing organic group can be determined, for example, by analysis such as Fourier transform infrared spectrophotometry (FT-IR) or nuclear magnetic resonance (NMR).

The curable silicone composition according to the present disclosure may comprise one type of epoxy group-containing resinous organopolysiloxane, or may comprise two or more types of epoxy group-containing resinous organopolysiloxane in combination.

The content of the epoxy group-containing resinous organopolysiloxane is not particularly limited, but when the curable silicone composition of the present disclosure includes the epoxy group-containing resinous organopolysiloxane, it can be included in an amount of preferably 0.1 mass % or more, more preferably 0.5 mass % or more, even more preferably 1 mass % or more based on the total mass of the whole organopolysiloxane components, and also, it can be included in an amount of 10 mass % or less, preferably 8 mass % or less, more preferably 5 mass % or less based on the total mass of the whole organopolysiloxane components.

(Cyclic Organopolysiloxane)

According to an embodiment, the curable silicone composition according to the present disclosure may include a cyclic organopolysiloxane and this cyclic organopolysiloxane can be represented by the following unit formula (IX):

$(R^7_2SiO)_n$  Unit formula (IX):

In the formula, $R^7$ are each independently an optionally halogen-substituted monovalent hydrocarbon group, and n is a number that provides a viscosity at 25° C. of 1000 mPa or less. Herein, the viscosity can be measured by means of a rotary viscometer conforming to JIS K7117-1.

In formula (IX), examples of the optionally halogen-substituted monovalent hydrocarbon groups of $R^7$ include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^7$ may also be a hydroxyl group or an alkoxy group such as methoxy or ethoxy, in small amounts, within the scope of not adversely affecting the objectives of the present disclosure.

According to an embodiment, the cyclic organopolysiloxane may include at least two alkenyl groups per molecule. When the cyclic organopolysiloxane includes alkenyl groups in the silicon atom-bonded organic groups, the alkenyl group content in the whole silicon atom-bonded organic groups is not particularly limited, and, for example, it is 10 mol % or more, preferably 20 mol % or more, more preferably 30 mol % or more. Further, the alkenyl group content in the whole silicon atom-bonded organic groups of the additional cyclic organopolysiloxane is not particularly limited, and, for example, it is 80 mol % or less, preferably 70 mol % or less, more preferably 60 mol % or less.

The cyclic organopolysiloxane content is not particularly limited, but when the curable silicone composition of the present disclosure includes the cyclic organopolysiloxane, it can be included in an amount of preferably 1 mass % or more, more preferably 2 mass % or more, even more preferably 3 mass % or more based on the total mass of the whole organopolysiloxane components, and, also, it can be included in an amount of 30 mass % or less, preferably 20 mass % or less, more preferably 10 mass % or less based on the total mass of the whole organopolysiloxane components.

In the curable silicone composition of the present disclosure, the ratio of the silicon atom-bonded hydrogen atom and silicon atom-bonded alkenyl group in the organopolysiloxane components is not particularly limited, and, for example, the silicon atom-bonded hydrogen atom is included in an amount of 0.3 mol or more, preferably 0.5 mol or more, more preferably 0.7 mol or more with respect to 1 mol of the silicon atom-bonded alkenyl group in the curable silicone composition, and, for example, the silicon atom-bonded hydrogen atom is included in an amount of 5 mol or less, preferably 4 mol or less, more preferably 3 mol or less, even more preferably 2 mol or less, particularly preferably 1.8 mol or less with respect to 1 mol of the silicon atom-bonded alkenyl group in the curable silicone composition.

(C) Catalyst for Hydrosilylation Reaction

The catalyst for hydrosilylation reaction of component (C) is a catalyst for promoting the curing of the curable silicone composition of the present disclosure. Examples of component (C) are, for example, platinum-based catalysts such as chloroplatinic acid, alcohol solution of chloroplatinic acid, platinum-olefin complex, platinum-1,3-divinyl-1,1,3,3-tetramethyldisiloxane complex, and platinum-supporting powder; palladium-based catalysts such as tetrakis(triphenylphosphine)palladium, and mixtures of triphenylphosphine and palladium black; and, additionally, rhodium-based catalysts; platinum-based catalysts are particularly preferred.

The blend amount of component (C) is a catalytic amount, and, more specifically, when a platinum-based catalyst is used as component (C), the platinum atom content is preferably 0.01 ppm or more, more preferably 0.1 ppm or more, even more preferably 1 ppm or more with respect to the total mass of the curable silicone composition of the present disclosure, and the platinum atom content is preferably 20 ppm or less, more preferably 15 ppm or less, even more preferably 10 ppm or less, particularly preferably 5 ppm or less with respect to the total mass of the curable silicone composition of the present disclosure.

(D) Curing Reaction Inhibitor

The curing reaction inhibitor of component (D) is a component for inhibiting the hydrosilylation reaction of the curable silicone composition. Examples of the curing reaction inhibitor include: alkyne alcohols such as 2-methyl-3-butyn-2-ol, 3,5-dimethyl-1-hexyn-3-ol, 2-phenyl-3-butyn-2-ol, and 1-ethynyl-1-cyclohexanol; enyne compounds such as 3-methyl-3-penten-1-yne and 3,5-dimethyl-3-hexen-1-yne; alkenyl group-containing low-molecular weight siloxanes such as tetramethyltetravinylcyclotetrasiloxane and tetramethyltetrahexenylcyclotetrasiloxane; and alkynyloxysilanes such as methyl-tris(1,1-dimethylpropynyloxy)silane and vinyl-tris(1,1-dimethylpropynyloxy)silane. Component (D) is preferably selected from alkyne alcohols, and 1-ethynyl-1-cyclohexanol is particularly preferred.

The content of curing reaction inhibitor (D) is not limited, but is preferably 100 ppm or more, more preferably 200 ppm or more, even more preferably 300 ppm or more, particularly preferably 400 ppm or more with respect to the total mass of the curable silicone composition of the present disclosure, and is preferably 50,000 ppm or less, more preferably 30,000 or less, even more preferably 20,000 ppm or less with respect to the total mass of the present composition.

Optional components can be blended into the curable silicone composition of the present disclosure within the range of not adversely affecting the objectives of the present disclosure. Examples of the optional components include an acetylene compound, an organophosphorus compound, a vinyl group-containing siloxane compound, inorganic fillers such as crushed quartz, silica, titanium oxide, magnesium carbonate, zinc oxide, iron oxide and diatomaceous earth, inorganic fillers obtained by subjecting the surface of said inorganic fillers to hydrophobic treatment with an organosilicon compound, organopolysiloxanes free from silicon atom-bonded hydrogen atoms and silicon atom-bonded alkenyl groups, an adhesive imparting agent, a heat resistance imparting agent, a cold resistance imparting agent, a heat conductive filler, a flame retardant, thixotropy imparting agent, coloring components such as pigments and dyes which include carbon black and phosphor, solvents, and the like.

From among the inorganic fillers, examples of silica include fumed silica, wet silica, crystalline silica, precipitated silica, and the like. Also, the silica may have been subjected to a surface hydrophobicizing treatment using an organosilicon compound such as an organoalkoxysilane compound, organochlorosilane compound, organosilazane compound, or low molecular weight siloxane compound, or a silane coupling agent, titanate coupling agent or the like.

The inorganic filler may be included in the curable silicone composition of the present disclosure in an amount of preferably 0.1 mass % or more, more preferably 1 mass % or more, even more preferably 3 mass % or more based on the total mass of the composition of the present disclosure, and may be included in the curable silicone composition in an amount of preferably 20 mass % or less, more preferably 15 mass % or less, even more preferably 10 mass % or less.

The curable silicone composition of the present disclosure can be prepared by mixing the components. The method of mixing the components may be a conventionally known method, and is not particularly limited, and a uniform mixture is usually obtained by simple mixing. When solid components such as inorganic filler are included as an optional component, it is preferable to use a mixing device for the mixing. There are no particular limitations regarding this mixing device, and examples include single- and twin-screw continuous mixers, triple roller mixers, Ross mixers, Hobart mixers, dental mixers, planetary mixers, kneader mixers, Henschel mixers, and the like.

The curable silicone composition of the present disclosure exhibits practically effective curability even at low temperatures, has a low shape deformation and shrinkage rate during curing, and can be cured in a short period of time to form a cured product. Therefore, since the curable silicone composition of the present disclosure does not need to be heated at a high temperature for a long period of time at the time of curing, it is possible to prevent the sealing shape from being deformed at the time of curing with heating at a low temperature for a short period of time. Further, the curable silicone composition of the present disclosure can be used to form a transparent cured product having high hardness. Therefore, it is particularly useful as an encapsulant for semiconductor elements, particularly optical semiconductor elements.

Encapsulant, Film

The present disclosure also relates to an encapsulant for semiconductors using the curable silicone composition of the present disclosure. The shape of the encapsulant of the present disclosure is not particularly limited, but is preferably a dome shape or a sheet shape. The semiconductor to be sealed with the encapsulant or film of the present disclosure is not particularly limited, and examples include semiconductors of SiC, GaN, etc., and particularly optical semiconductors such as power semiconductors and light emitting diodes.

With the encapsulant of the present disclosure, since the curable silicone composition of the present disclosure is used and it exhibits practically effective curability even at low temperatures, semiconductor elements can be sealed at low temperature. Therefore, it is possible to prevent the encapsulant from being deformed due to heating at high temperature, and to prevent semiconductor elements from being damaged by heat. In addition, with the encapsulant of the disclosure, since the curable silicone composition of the present disclosure is used, a transparent cured product having high hardness can be formed. A semiconductor package with excellent reliability can be manufactured.

Optical Semiconductor Element

The present disclosure also relates to an optical semiconductor element that is equipped with the encapsulant of the present disclosure. The optical semiconductor element can be, for example, a light-emitting diode (LED), semiconductor laser, photodiode, phototransistor, or a light-emitting body or light-receiving body for a photocoupler or solid-state imaging; it is particularly preferably a light-emitting diode (LED).

Light-emitting diodes (LEDs) emit light from the upper, lower, left and right sides of the optical semiconductor element, and so it is undesirable for parts constituting the light-emitting diode (LED) to absorb light, and materials having high light transmittance or high reflectance are preferred for said parts. Consequently, the substrate on which the optical semiconductor element is mounted also preferably comprises a material having high light transmittance or high reflectance. As the substrate on which the optical semiconductor element is mounted, for example, conductive metals such as silver, gold, and copper; non-conductive metals such as aluminium and nickel; thermoplastic resins mixed with white pigments such as PPA and LCP; thermosetting resins containing white pigments such as epoxy resins, BT resins, polyimide resins, and silicone resins; and ceramics such as alumina and alumina nitride may be used.

The optical semiconductor element of the present disclosure is sealed with the encapsulant of the present disclosure and thus exhibits excellent reliability.

EXAMPLES

The curable silicone composition of the present disclosure is described in more detail by way of the following examples and comparative examples.

Examples 1 to 4 and Comparative Examples 1 to 4

Curable silicone compositions were prepared by mixing the components as the formulations (parts by weight) shown in the table. It should be noted that hereinbelow, Me denotes a methyl group, Vi denotes a vinyl group, Ph denotes a phenyl group, and Ep denotes a 3-glycidoxypropyl group. In addition, the structure of the organopolysiloxane components is shown in a simplified manner in the table, and functional groups other than Me in the M, D, or T unit are shown in parentheses. In addition, H/Vi indicates the molar ratio of the silicon atom-bonded hydrogen atom (H) and the vinyl group (Vi) in the organopolysiloxane components.

(Component a: Alkenyl Group-Containing Organopolysiloxane)

Component a-1: linear alkenyl group-containing organopolysiloxane represented by average structural formula $ViMe_2SiO(PhMeSiO)_{20}SiMe_2Vi$ Component a-2: linear alkenyl group-containing organopolysiloxane represented by average structural formula $ViMe_2SiO(Me_2SiO)_{60}(Ph_2SiO)_{30}SiMe_2Vi$ Component a-3: resinous alkenyl group-containing organopolysiloxane represented by average unit formula $(Me_3SiO_{1/2})_5(ViMe_2SiO_{1/2})_{17}(MeSiO_{3/2})_{39}(PhSiO_{3/2})_{39}$ Component a-4: resinous alkenyl group-containing organopolysiloxane represented by average unit formula $(Me_3SiO_{1/2})_{14}(ViMe_2SiO_{1/2})_{11}(MeSiO_{3/2})_{53}(PhSiO_{3/2})_{22}$ Component a-5: resinous alkenyl group-containing organopolysiloxane represented by average unit formula $(Me_3SiO_{1/2})_{45}(ViMe_2SiO_{1/2})_{15}(SiO_{4/2})_{40}$ Component a-6: resinous alkenyl group and epoxy group-containing organopolysiloxane represented by average unit formula $(ViMe_2SiO_{1/2})_{25}(Ph\ SiO_{3/2})_{75}(EpMeSiO_{2/2})_{40}$ Component a-7: cyclic alkenyl group-containing organopolysiloxane represented by average unit formula $(ViMe\ SiO_{2/2})_4$ Component a-8: resinous alkenyl group-containing organopolysiloxane represented by average unit formula $(ViMe_2SiO_{1/2})_{25}(PhSiO_{3/2})_{75}$ Component a-9: linear alkenyl group-containing organopolysiloxane represented by average structural formula $ViMe_2SiO(Me_2SiO)_{150}SiMe_2Vi$ Component a-10: linear alkenyl group-containing organopolysiloxane represented by average structural formula $ViMe_2510(Me_2SiO)_{530}SiMe_2Vi$ Component a-11: resinous alkenyl group-containing organopolysiloxane represented by average unit formula $(ViMe_2SiO_{1/2})_{11}(Me_3SiO_{1/2})_{34}(SiO_{4/2})_{55}$ (Component b: Organohydrogenpolysiloxane)

Component b-1: resinous organohydrogenpolysiloxane represented by average unit formula $(HMe_2SiO_{1/2})_{60}(PhSiO_{3/2})_{40}$ Component b-2: resinous organohydrogenpolysiloxane represented by average unit formula $(HMe_2SiO_{1/2})(SiO_{4/2})$ Component b-3: linear organohydrogenpolysiloxane represented by average structural formula $HMe_2SiO(Ph_2SiO)SiMe_2H$ Component b-4: linear organohydrogenpolysiloxane represented by average structural formula $Me_3SiO(MeHSiO)_{50}SiMe_3$ Component c: Complex of platinum having a platinum concentration of 4.0 mass % and 1,3-divinyl-1,1,3,3-tetramethyldisiloxane Component d: 1-ethynyl-2-cyclohexanol Component e: Fumed silica Evaluation With respect to the resulting curable silicone compositions of the examples and comparative examples, viscosity, curability at low temperatures (60, 100° C.), shape deformation before and after curing, heat shrinkage, hardness of cured product, light transmittance of cured product, and appearance after ageing (150° C.) on LED devices were evaluated as shown below. The evaluations shown below were not performed on the composition of comparative example 4 because the component was incompatible.

<Viscosity>

The viscosity of the obtained curable silicone compositions was measured at 25° C. with a rotary viscometer conforming to JIS K7117-1.

<Curability at Low Temperatures>

The obtained curable silicone compositions were evaluated for curing behaviour at low temperatures (60 or 100° C.). Specifically, the composition was left in a constant temperature bath at 60° C. or 100° C. for a predetermined period, and the time required for the composition to cure was measured. Silicone cured at 60° C. or 100° C. within 1 hour was considered to be a silicone superior in moulding.

<Shape Deformation>

With respect to the obtained curable silicone compositions, silicone coated on a glass substrate at a height of about 1 mm by means of dispense molding was cured at 100° C. for 60 minutes in a constant temperature bath, the height change of the cured product was measured, and the rate of change in shape before and after curing was calculated. Any silicone showing a height change of the cured product of 10% or less was considered to be a shape-stable silicone.

<Heat Shrinkage Rate>

With respect to the obtained curable silicone compositions, a 1 mm thick sheet was heated by means of hot press molding at 60° C. or 100° C. for 60 minutes (if complete curing was not achieved in 60 minutes at 100° C., curing was performed at 150° C.) in order to carry out molding, and the size of the cured sheet was measured, and the shrinkage rate from the mold was calculated. The inner dimension of the mold was 120 mm×120 mm. Silicone exhibiting a heat shrinkage rate of 1% or less was considered to be a silicone with suitable dimensional stability.

<Hardness of Cured Product>

The obtained curable silicone composition was subjected to press molding for 60 minutes at 60° C. or 100° C. in order to prepare a sheet-like cured product. The hardness of this sheet-like cured product at 25° C. was measured by means of a type D durometer specified in "Hardness test method for vulcanized rubber and thermoplastic rubber" according to JIS K 6253-1997.

<Light Transmittance of Cured Product>

The obtained curable silicone composition was placed between two transparent glass sheets and heated at 60° C. or 100° C. for 1 hour to cure, and a test piece having an optical path length of 1 mm was prepared. The light transmittance of this test piece was measured at 25° C. by using a self-recording spectrophotometer capable of measuring at any wavelength in the range of visible light (wavelengths of 400 nm to 700 nm). In Table 1, the values of the light transmittance at a wavelength of 450 nm are shown.

<Observation on Appearance of Cured Product after Ageing>

The obtained curable silicone composition was applied onto an LED substrate and heated in a constant temperature bath at 60 or 100° C. for 60 minutes for molding. The appearance of the obtained sheet after ageing at 150° C. for 1000 hours was observed, and the presence or absence of cracks or delamination was observed.

The above evaluation results are shown in the table below.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Component | | | | | | | | |
| a-1 M(Vi)-D(Ph)$_{20}$-M(Vi) | — | — | — | — | — | 17.5 | — | — |
| a-2 M(Vi)-D$_{60}$-D(Ph$_2$)$_{30}$-M(Vi) | 4.8 | 4.8 | 4.8 | 4.8 | — | — | 9.1 | 4.8 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| a-3 $M_5$-$M(Vi)_{17}$-$T_{39}$-$T(Ph)_{39}$ | 43.4 | 42.6 | — | — | — | — | 59.5 | 43.4 |
| a-4 $M_{14}$-$M(Vi)_{11}$-$T_{53}$-$T(Ph)_{22}$ | — | — | 58 | 55.6 | — | — | — | — |
| a-5 $M_{45}$-$M(Vi)_{15}$-$Q_{40}$ | 20 | 20 | 10 | 5.0 | — | — | — | 20 |
| a-6 $M(Vi)_{25}$-$T(Ph)_{75}$-$D(Ep)_{40}$ | 2.5 | 2.5 | 2.5 | 2.5 | — | 2.3 | 3.0 | 2.5 |
| a-7 $D(Vi)_4$ | — | — | — | 4.5 | — | 0.2 | 1.0 | — |
| a-8 $M(Vi)_{25}$-$T(Ph)_{75}$ | — | — | — | — | — | 54.7 | — | — |
| a-9 $M(Vi)$-$D_{150}$-$M(Vi)$ | — | — | — | — | 48.4 | — | — | — |
| a-10 $M(Vi)$-$D_{530}$-$M(Vi)$ | — | — | — | — | 22.2 | — | — | — |
| a-11 $M(Vi)_{11}$-$M_{34}$-$Q_{55}$ | — | — | — | — | 22.8 | — | — | — |
| b-1 $M(H)_{60}$-$T(Ph)_{40}$ | — | — | — | — | — | 2.4 | 10.0 | — |
| b-2 $M(H)$-$Q$ | 13 | 10 | 6.5 | 3.0 | — | — | — | — |
| b-3 $M(H)$-$D(Ph_2)$-$M(H)$ | 11.3 | 15.1 | 13.2 | 19.6 | — | 19.4 | 13.9 | 11.3 |
| b-4 M-$D(H)_{50}$-M | — | — | — | — | 3.1 | — | — | 13 |
| c | 0.008 | 0.008 | 0.008 | 0.008 | 0.02 | 0.007 | 0.01 | 0.008 |
| d | 0.1 | 0.1 | 0.5 | 0.3 | 0.02 | — | 0.05 | 0.05 |
| e | 5 | 5 | 5 | 5 | 3.5 | 3.5 | 3.5 | 5 |
| Total of a, b and e components | 100 | 100 | 100 | 100 | 100 | 100 | 100 | 100 |
| H/Vi | 1.5 | 1.5 | 1.5 | 1.0 | 1.5 | 1.0 | 1.1 | 1.7 |
| Platinum content (ppm) | 3 | 3 | 3 | 3 | 10 | 2.5 | 5 | |
| Evaluation | | | | | | | | |
| Viscosity (mPa · s) | 6000 | 4000 | 12000 | 7000 | 7000 | 13000 | 15000 | Mixture incompatible |
| Hardness | D50 | D35 | D50 | D50 | A30 | D30 | D65 | |
| Shape Deformation % | 5 | 6 | 8 | 9 | 3 | 15 | 15 | |
| Time (minutes) required for complete curing at 60° C. | 30 | 45 | 40 | >120 | 120 | >120 | >120 | |
| Time (minutes) required for complete curing at 100° C. | <2 | 5 | 4 | 30 | 60 | >60 | >60 | |
| Heat Shrinkage Rate % | 0.7 | 0.7 | 0.7 | 0.9 | 0.7 | 3.0 | 3.0 | |
| Light transmittance % (450 nm) | 98 | 98 | 98 | 95 | 65 | 30 | 60 | |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Generation of cracks or delamination during ageing at 150° C. | no | no | no | no | yes | no | yes | |

As is clear from the above results, the curable silicone composition of the present disclosure cures within 60 minutes at low temperatures, and thus it can exhibit practically effective curability even at low temperatures. In addition, the obtained cured product shows low shape deformation and shrinkage rate during curing, and can exhibit high hardness and transparency.

INDUSTRIAL APPLICABILITY

The curable silicone composition of the present disclosure exhibits practically effective curability even at low temperatures, has a low shrinkage rate during curing, can be cured within a short period of time, and can provide a transparent cured product having high hardness, and thus the composition is very useful for dome-shaped or sheet-shaped encapsulant applications in manufacturing semiconductor packages.

The invention claimed is:

1. A curable silicone composition which forms a cured product of having a type D durometer hardness of 30 or more at 25° C. and having a light transmittance of 95% or more at wavelengths ranging from 400 nm to 700 nm, said curable silicone composition comprising:
   (A) a resinous alkenyl group-containing organopolysiloxane including at least two alkenyl groups per molecule and at least one ($SiO_{4/2}$) unit, wherein said resinous alkenyl group-containing organopolysiloxane (A) is present in an amount of 4 mass % or more based on a total mass of organopolysiloxane components in said curable silicone composition and which is represented by the following average unit formula (II):

$(R^1_3SiO_{1/2})_a(SiO_{4/2})_d(XO_{1/2})_e$ (II), wherein each $R^1$ are the same or different $C_{1-6}$ alkyl groups or $C_{2-6}$ alkenyl groups and where at least two $R^1$ in one molecule are alkenyl groups, wherein X is a hydrogen atom or an alkyl group, and wherein $0.2 \leq a < 1$, $0 < d < 0.8$, $0 \leq e < 0.4$, and $a+d=1.0$ are satisfied,
   (B) a resinous organohydrogenpolysiloxane including at least two silicon atom-bonded hydrogen atoms per molecule and at least one ($SiO_{4/2}$) unit, wherein said resinous organohydrogenpolysiloxane (B) is present in an amount of 2 mass % or more based on the total mass of organopolysiloxane components in said curable silicone composition and which is represented by the following average unit formula (IV):

$(R^2_3SiO_{1/2})_a(SiO_{4/2})_d(XO_{1/2})_e$ (IV), wherein each $R^2$ are the same or different and comprise a hydrogen atom or a $C_{1-6}$ alkyl group and where at least two $R^2$ in one molecule are hydrogen atoms, wherein X is a hydrogen atom or an alkyl group, and wherein $0.2 \leq a < 1$, $0 \leq d \leq 0.8$, $0 \leq e < 0.4$, and $a+d=1.0$ are satisfied, wherein the viscosity of component (B) is within the range of from 1 mPa to 500 mPa at 25° C., (C) a catalyst for hydrosilylation reaction,
   (D) a curing reaction inhibitor,
   (E) (E-1) a linear alkenyl group-containing organopolysiloxane having at least one aryl group in one molecule, wherein an aryl group content in said linear alkenyl group-containing organopolysiloxane (E-1) is 10 mol % or more of a total content of silicon atom-bonded organic groups in said curable silicone composition and (E-2) a resinous alkenyl group-containing organopolysiloxane free from siloxane units represented by ($SiO_{4/2}$) and having at least one aryl group in one molecule, wherein said resinous alkenyl group-containing organopolysiloxane (E-2) is present in at an amount of 30 mass % or more based on the total mass of organopolysiloxane components in said curable silicone composition, wherein an aryl group content in said resinous alkenyl group-containing organopolysiloxane (E-2) is 3 mol % or more of a total content of silicon atom-bonded organic groups in said curable silicone composition, and
   (F) a linear organohydrogenpolysiloxane having at least one aryl group in one molecule, wherein an aryl group content in said linear organohydrogenpolysiloxane (F) is 10 mol % or more of a total content of silicon atom-bonded organic groups in said linear organohydrogenpolysiloxane in said curable silicone composition.

2. The curable silicone composition as claimed in claim 1, wherein (C) the catalyst for hydrosilylation reaction is a platinum-based catalyst and is included in an amount such that the content of the platinum atoms is 10 ppm or less with respect to the total mass of the curable silicone composition.

3. The curable silicone composition as claimed in claim 1, wherein the content of (D) the curing reaction inhibitor is 200 ppm or more with respect to the total mass of the curable silicone composition.

4. The curable silicone composition as claimed in claim 1, further comprising both of a linear alkenyl group-containing organopolysiloxane having at least one aryl group in one molecule and a resinous alkenyl group-containing organopolysiloxane free from siloxane units represented by ($SiO_{4/2}$) and having at least one aryl group in one molecule.

5. The curable silicone composition as claimed in claim 1, further comprising silica as an inorganic filler.

6. An encapsulant comprising the curable silicone composition as claimed in claim 1.

7. An optical semiconductor device comprising the encapsulant as claimed in claim 6.

8. The curable silicone composition as claimed in claim 2, wherein the content of (D) the curing reaction inhibitor is 200 ppm or more with respect to the total mass of the curable silicone composition.

9. The curable silicone composition as claimed in claim 1, wherein the cured product of the curable silicone composition has a type D durometer hardness of 30 or more at 25° C.

10. A curable silicone composition which provides a transparent cured product having a type D durometer hardness of 20 or more at 25° C. when cured at a temperature of 60° C., the curable silicone composition comprising:

(A) a resinous alkenyl group containing organopolysiloxane including at least two alkenyl groups per molecule and at least one $(SiO_{4/2})$ unit, wherein said resinous alkenyl group-containing organopolysiloxane (A) is present in an amount of 10 mass % or more based on a total mass of organopolysiloxane components in said curable silicone composition, which is represented by the following average unit formula (II):

$$(R^1{}_3SiO_{1/2})_a(SiO_{4/2})_d(XO_{1/2})_e \qquad (II),$$

wherein $R^1$ are the same or different optionally halogen-substituted monovalent hydrocarbons where at least two $R^1$ in one molecule are alkenyl groups, wherein X is a hydrogen atom or an alkyl group, and wherein $0 \leq a < 1$, $0 < d < 0.8$, $0 \leq e < 0.4$, and $a+d=1.0$ are satisfied, (B) a resinous organohydrogenpolysiloxane including at least two silicon atom-bonded hydrogen atoms per molecule and at least one $(SiO_{4/2})$ unit, wherein said resinous organohydrogenpolysiloxane (B) is present in an amount of 6.5 mass % or more based on a total mass of organopolysiloxane components in said curable silicone composition, which is represented by the following average unit formula (IV):

$$(R^2{}_3SiO_{1/2})_a(SiO_{4/2})_d(XO_{1/2})_e \qquad (IV),$$

wherein each $R^2$ are the same or different and comprise a hydrogen atom or an optionally halogen-substituted monovalent hydrocarbon group other than an alkenyl group where at least two $R^2$ in one molecule are hydrogen atoms, wherein X is a hydrogen atom or an alkyl group, and wherein $0 \leq a < 1.0$, $0 \leq d \leq 0.8$, $0 \leq e < 0.4$, and $a+d=1.0$ are satisfied, wherein the viscosity of component (B) is within the range of from 1 mPa to 500 mPa at 25° C., (C) a catalyst for hydrosilylation reaction, (D) a curing reaction inhibitor;

(E) (E-1) a linear alkenyl group-containing organopolysiloxane having at least one aryl group in one molecule, wherein an aryl group content in said linear alkenyl group-containing organopolysiloxane (E-1) is 10 mol % or more of a total content of silicon atom-bonded organic groups in said curable silicone composition and (E-2) a resinous alkenyl group-containing organopolysiloxane free from siloxane units represented by $(SiO_{4/2})$ and having at least one aryl group in one molecule, wherein said resinous alkenyl group-containing organopolysiloxane (E-2) is present in an amount of 30 mass % or more based on the total mass of organopolysiloxane components in said curable silicone composition, and wherein an aryl group content in said resinous alkenyl group-containing organopolysiloxane (E-2) is 3 mol % or more of a total content of silicon atom-bonded organic groups in said curable silicone composition, and (F) a linear organohydrogenpolysiloxane having at least one aryl group in one molecule, wherein an aryl group content in said linear organohydrogenpolysiloxane is 10 mol % or more of a total content of silicon atom-bonded organic groups in said linear organohydrogenpolysiloxane in said curable silicone composition, and wherein a ratio between silicon-bonded hydrogen atoms and alkenyl groups in said curable silicone composition is greater than 1.0.

11. The curable silicone composition as claimed in claim 1, wherein the cured product of the curable silicone composition has a type D durometer hardness of 20 or more at 25° C.

* * * * *

UNITED STATES PATENT AND TRADEMARK OFFICE
CERTIFICATE OF CORRECTION

PATENT NO. : 12,247,125 B2
APPLICATION NO. : 17/361788
DATED : March 11, 2025
INVENTOR(S) : Sawako Horie et al.

It is certified that error appears in the above-identified patent and that said Letters Patent is hereby corrected as shown below:

In the Claims

Claim 10, Column 27, Line 35, please delete "Wherein $0 \leq a < 1.0$" and replace with -- Wherein $0 \leq a \leq 1.0$ --

Signed and Sealed this
Fifteenth Day of April, 2025

Coke Morgan Stewart
*Acting Director of the United States Patent and Trademark Office*